Figure 1:
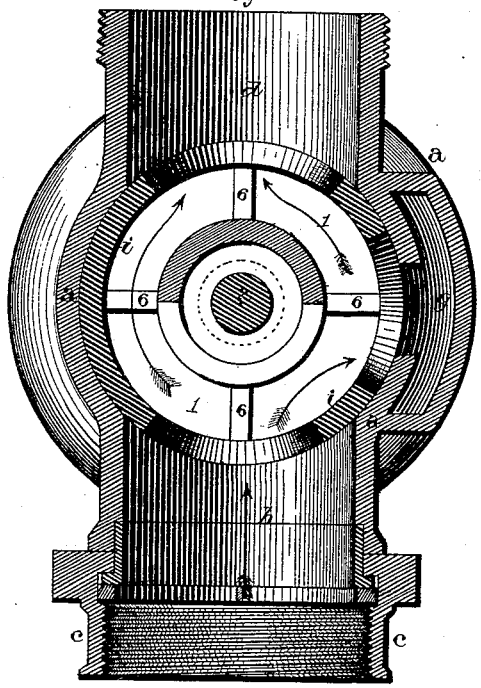
Figure 2:
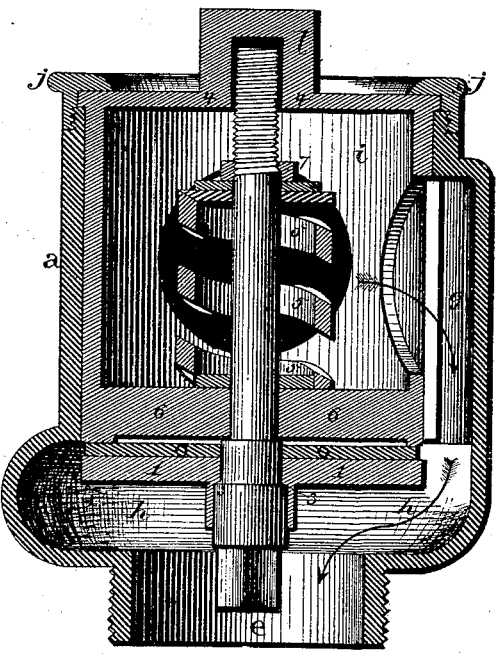

G. C. SWEET.
Relief-Valves.

No. 153,632. Patented July 28, 1874.

WITNESSES.

INVENTOR.
Geo. C. Sweet
per
F. A. Lehmann, Atty

UNITED STATES PATENT OFFICE.

GEORGE C. SWEETT, OF NORWICH, CONNECTICUT, ASSIGNOR OF ONE-HALF HIS RIGHT TO W. S. PALMER, OF SAME PLACE.

IMPROVEMENT IN RELIEF-VALVES.

Specification forming part of Letters Patent No. 153,632, dated July 28, 1874; application filed June 2, 1874.

*To all whom it may concern:*

Be it known that I, GEORGE C. SWEETT, of Norwich, in the county of New London and State of Connecticut, have invented certain new and useful Improvements in Relief-Valves; and I do hereby declare the following to be a full, clear, and exact description of the invention, such as will enable others skilled in the art to which it pertains to make and use it, reference being had to the accompanying drawings which form part of this specification.

The nature of my invention relates to an improvement in combined relief-valves and stop-cocks; and it consists in a hollow plug, having openings through it for supplying one or more sets of hose with water, and in which is placed a relief-valve which opens as soon as the pressure exceeds a desired point, and allows the water to escape through the bottom of the shell.

It also consists in a shell having a chamber or opening made in one side, into which the water flows when the plug is properly turned, so as to supply a second set of hose, this chamber or opening being connected with a groove formed on the inside of the shell, below the bottom of the plug.

The accompanying drawings represent my invention.

A represents the shell, having either a straight or tapering bore for the plug, and which has one opening, b, provided with a coupling, c, for admitting the water, and an opening, d, through its side, and another, e, through its bottom for its escape. By means of the coupling c the valve can be secured to either fire-plug or engine, and to the openings d e are attached two sets of hose. Formed in the side of this shell, between the two openings b d, is a chamber, g, the lower end of which opens into a groove, h, formed around the inside of the shell at right angles to the chamber, so that the water which escapes when the relief-valve opens, and which flows into the chamber through the plug, will at once escape through the groove and opening e into the hose. The plug i is made hollow, and has three openings through, which can be so turned that a stream of water can be sent through both sets of hose at once or either one desired, or the flow of water entirely stopped. This plug is held in position by a screw-cap, j, and is provided upon its top with a knob, l, or other device, by which the plug is turned around, and upon which knob is marked the position of the three openings, so that the operator can see at a glance in which direction to turn. The plug is provided with a removable bottom, 1, made water-tight by a suitable packing, o, and through which a screw-rod, 2, provided with a shoulder, 3, passes up through the center of the plug, and has its upper end centered in the under side of the top 4. Around this rod is placed a coiled spring, 5, the lower end of which rests upon the top of the spider 6, formed in the bottom of the plug, while its upper end bears upward against an adjustable nut, 7, by means of which nut the tension of the spring can be regulated at will, and set at any desired pressure. The object of this spring and movable bottom in the plug is to regulate the pressure of water in the hose, so that as soon as the pressure exceeds a certain limit, the bottom will open and let the water escape through the opening e, and thus prevent the hose from being burst. When it is desired to use but a single set of hose, the plug is turned so that two of its openings will register with the inlet b, and an outlet, d, or chamber g, while the third will be closed by the side of the shell. When it is desired to use both sets at once, the plug is turned so as to register with the inlet b, outlet d, and chamber g. Should both sets of hose be used at the same time, the plug can be turned so as to stop either one desired, without interfering with the other. If but the set attached to the opening d is being used when the water is shut off, all the water in the hose can be run off through the chamber g and opening e, leaving the hose free to be readily handled.

Having thus described my invention, I claim—

1. The shell a, having the chambers g formed on one side, which chamber communicates with an opening in the plug $i$ at its top, and with the opening $e$ through the bottom of the shell, substantially as set forth.

2. The shell $a$, having the groove $h$ formed around its inside, in combination with a plug provided with a relief-valve, substantially as specified.

3. A hollow plug, having located in its center a screw-rod, spring, adjusting-nut, and spider, in combination with a relief-valve, substantially as shown and described.

4. The combination of the shell $a$, having a chamber, $g$, formed in its side, and a groove, $h$, around its lower end, in combination with a hollow three-way plug, provided with a relief-valve, substantially as set forth.

In testimony that I claim the foregoing I have hereunto set my hand this 25th day of May, 1874.

GEORGE C. SWEETT.

Witnesses:
CHAS. E. WHITAKER,
AUGUSTUS GOULD.